United States Patent
Roitman et al.

(10) Patent No.: US 11,790,885 B2
(45) Date of Patent: Oct. 17, 2023

(54) SEMI-STRUCTURED CONTENT AWARE BI-DIRECTIONAL TRANSFORMER

(71) Applicant: INTERNATIONAL BUSINESS MACHINES CORPORATION, Armonk, NY (US)

(72) Inventors: Haggai Roitman, Yoknea'm Ellit (IL); Yosi Mass, Ramat Gan (IL); Doron Cohen, Gilon (IL); Jatin Ganhotra, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 17/313,586

(22) Filed: May 6, 2021

(65) Prior Publication Data

US 2022/0358906 A1 Nov. 10, 2022

(51) Int. Cl.
*G10L 13/08* (2013.01)
*G10L 15/18* (2013.01)

(52) U.S. Cl.
CPC ............ *G10L 13/086* (2013.01); *G10L 15/18* (2013.01)

(58) Field of Classification Search
CPC .............................. G10L 13/086; G10L 15/18
See application file for complete search history.

(56) References Cited

U.S. PATENT DOCUMENTS

| | | | |
|---|---|---|---|
| 2003/0182102 A1* | 9/2003 | Corston-Oliver | G06F 40/56 704/9 |
| 2009/0190839 A1* | 7/2009 | Higgins | G06F 16/3347 382/209 |
| 2017/0286835 A1* | 10/2017 | Ho | G06F 40/247 |
| 2020/0250234 A1* | 8/2020 | Teofili | G06F 16/9024 |
| 2021/0134418 A1* | 5/2021 | Frieder | G06N 20/10 |
| 2021/0312628 A1* | 10/2021 | Larlus-Larrondo | G06T 7/73 |

FOREIGN PATENT DOCUMENTS

CN 111680156 A 9/2020

OTHER PUBLICATIONS

Deng, Xingchen, Lei Zhang, Yixing Fan, Long Bai, Jiafeng Guo, and Pengfei Wang. "Bidirectional Dependency-Guided Attention for Relation Extraction." In Asian Conference on Machine Learning, pp. 129-144. PMLR, 2020. (Year: 2020).*

(Continued)

*Primary Examiner* — Daniel C Washburn
*Assistant Examiner* — Paul J. Mueller
(74) *Attorney, Agent, or Firm* — Caleb D. Wilkes

(57) ABSTRACT

A method, computer system, and a computer program product for natural language processing are provided. A first text corpus that includes semi-structured content that includes hierarchical nodes may be received. Some of the hierarchical nodes may be masked. Node embeddings and level embeddings may be generated from the semi-structured content of the first text corpus and from the masked hierarchical nodes. The node embeddings and the level embeddings may be included in a bi-directional transformer model. The bi-directional transformer model may be trained on the first text corpus by reducing loss from the bi-directional transformer model predicting the masked hierarchical nodes.

20 Claims, 11 Drawing Sheets

(56) References Cited

OTHER PUBLICATIONS

Zhu, Henghui, Feng Nan, Zhiguo Wang, Ramesh Nallapati, and Bing Xiang. "Who Did They Respond To? Conversation Structure Modeling Using Masked Hierarchical Transformer." In Proceedings of the AAAI Conference on Artificial Intelligence, vol. 34, No. 05, pp. 9741-9748. 2020. (Year: 2020).*
Adhikari et al., "DocBERT: BERT for Document Classification," arXiv:1904.08398v3 [cs.CL] Aug. 22, 2019, Retrieved from the Internet: https://arxiv.org/abs/1904.08398, 7 pages.
Aly et al., "Hierarchical Multi-label Classification of Text with Capsule Networks," Proceedings of the 57th Annual Meeting of the Association for Computational Linguistics: Student Research Workshop, Jul. 28-Aug. 2, 2019, Retrieved from the Internet: https://www.aclweb.org/anthology/P19-2045.pdf, pp. 323-330.
Canet, "Extracting the author of news stories with DOM-based segmentation and BERT," Jan. 17, 2020, towards data science, Retrieved from the Internet: https://towardsdatascience.com/extracting-the-author-of-news-stories-with-dom-based-segmentation-and-bert-69225ea0e5c2, 12 pages.
Devlin et al., "BERT: Pre-training of Deep Bidirectional Transformers for Language Understanding," Proceedings of NAACL-HLT, 2019, Retrieved from the Internet: https://www.aclweb.org/anthology/N19-1423.pdf, pp. 4171-4186.
Garncarek et al., "LAMBERT: Layout-Aware language Modeling using BERT for information extraction," arXiv:2002.08087v2 [cs.CL] Mar. 6, 2020, 18 pages.
Herzig et al., "TAPAS: Weakly Supervised Table Parsing via Pre-training," arXiv:2004.02349v2 [cs.IR] Apr. 21, 2020, Retrieved from the Internet: https://arxiv.org/abs/2004.02349, 14 pages.
Karlsson, "Introducing a Hierarchical Attention Transformer for document embeddings," Student Thesis, KTH Royal Institute of Technology—School of Electrical Engineering and Computer Science, Stockholm, Sweden, Dec. 8, 2019, Retrieved from the Internet: http://kth.diva-portal.org/smash/get/diva2:1415984/FULLTEXT01.pdf, 74 pages.
Lu et al., "VGCN-BERT: Augmenting BERT with Graph Embedding for Text Classification," arXiv:2004.05707v1 [cs.CL] Apr. 12, 2020, Retrieved from the Internet: https://arxiv.org/pdf/2004.05707.pdf, 15 pages.
Ostendorff et al. "Enriching BERT with Knowledge Graph Embeddings for Document Classification," arXiv:1909.08402v1 [cs.CL] Sep. 18, 2019, Retrieved from the Internet: https://arxiv.org/pdf/1909.08402.pdf, 8 pages.
Pappagari et al., "Hierarchical Transformers for Long Document Classification," arXiv: 1910.10781v1 [cs.CL] Oct. 23, 2019, Retrieved from the Internet: https://arxiv.org/pdf/1910.10781v1.pdf, 7 pages.
Qu et al., "BERT with History Answer Embedding for Conversational Question Answering," arXiv:1905.05412v2 [cs.IR] Oct. 27, 2019, Retrieved from the Internet: https://arxiv.org/pdf/1905.05412.pdf, 5 pages.
Qu et al., "Contextual Re-Ranking with Behavior Aware Transformers," SIGIR '20: Proceedings of the 43rd International ACM SIGIR Conference on Research and Development in Information Retrieval, Jul. 2020, pp. 1589-1592, https://doi.org/10.1145/3397271.3401276.
Wang et al., "Structbert: Incorporating Language Structures Into Pre-Training for Deep Language Understanding," arXiv: 1908.04577v3 [cs.CL] Sep. 27, 2019, Retrieved from the Internet: https://arxiv.org/pdf/1908.04577.pdf, 9 pages. Alibaba Group Inc. (hebian.ww,b.bi,ym119608,wuchen.wc,zuyi.bzy,jiangnan.xjn,liwei.peng,luo.si}@alibaba-inc.com.
Wei et al., "Robust Layout-aware IE for Visually Rich Documents with Pre-trained Language Models," arXiv:2005. 11017v1 [cs.CL] May 22, 2020, Retrieved from the Internet: https://arxiv.org/pdf/2005.11017.pdf, 10 pages.
Xu et al., "LayoutLM: Pre-training of Text and Layout for Document Image Understanding," arXiv:1912.13318v5 [cs.CL] Jun. 16, 2020, Retrieved from the Internet: https://arxiv.org/pdf/1912.13318.pdf, 9 pages.
Yang et al., "Hierarchical Attention Networks for Document Classification," Proceedings of NAACL-HLT 2016, Jun. 12-17, 2016, Retrieved from the Internet: https://www.aclweb.org/anthology/N16-1174.pdf, pp. 1480-1489.
Yu et al., "Improving BERT-based Text Classification With Auxiliary Sentence and Domain Knowledge," IEEE Access, Nov. 2019, DOI: 10.1109/ACCESS.2019.2953990, 14 pages.
Zhang et al., "BERT-XML: Large Scale Automated ICD Coding Using BERT Pretraining," Proceedings of the 3rd Clinical Natural Language Processing Workshop, Nov. 19, 2020, pp. 24-34.
Zhang et al., "HIBERT: Document Level Pre-training of Hierarchical Bidirectional Transformers for Document Summarization," Association for Computational Linguistics, Proceedings of the 57th Annual Meeting of the Association for Computational Linguistics, Jul. 2019, https://www.aclweb.org/anthology/P19-1499, pp. 5059-5069.
Zhang et al., "Rapid Adaptation of BERT for Information Extraction on Domain-Specific Business Documents," arXiv:2002.01861v1 [cs.CL] Feb. 5, 2020, Retrieved from the Internet: https://www.researchgate.net/publication/339065920, 8 pages.
Zong et al., "GNN-XML: Graph Neural Networks for Extreme Multi-label Text Classification," ResearchGate, Aug. 2020, DOI: 10.13140/RG.2.2.32294.14407, 12 pages.
Mell et al., "The NIST Definition of Cloud Computing", Recommendations of the National Institute of Standards and Technology, NIST Special Publication 800-145, Sep. 2011, 7 pages.

* cited by examiner

US 11,790,885 B2

SEMI-STRUCTURED CONTENT AWARE BI-DIRECTIONAL TRANSFORMER

BACKGROUND

The present invention relates generally to the field of natural language processing, and more particularly to helping computers understand ambiguous language in text.

SUMMARY

According to one exemplary embodiment, a method for natural language processing is provided. The method may include receiving a first text corpus that includes semi-structured content that includes hierarchical nodes. Some of the hierarchical nodes may be masked. Node embeddings and level embeddings may be generated from the semi-structured content of the first text corpus and from the masked hierarchical nodes. The node embeddings and the level embeddings may be included in a bi-directional transformer model. The bi-directional transformer model may be trained on the first text corpus by reducing loss from the bi-directional transformer model predicting the masked hierarchical nodes. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, a method, and a computer program product for creating embeddings from semi-structured content in order to enhance natural language processing. As such, the present embodiments have the capacity to improve the technical field of natural language processing (i.e., "NLP") by allowing various NLP tasks to be more readily performed on semi-structured content. For example, the present embodiments enable semantic similarity, text summarization, and document classification to be more readily performed on text that includes semi-structured content. The present embodiments allow snippets of semi-structured content to be more readily compared. The present embodiments allow automated reading comprehension to be more readily performed on raw semi-structured content. The present embodiments allow a factoid span in semi-structured content to be more easily found via natural language processing.

The present embodiments allow enhancement of multi-layer, bi-directional, transformers to understand and, in their predictive ability, to account for hierarchy that is present in semi-structured content.

Figure 1:
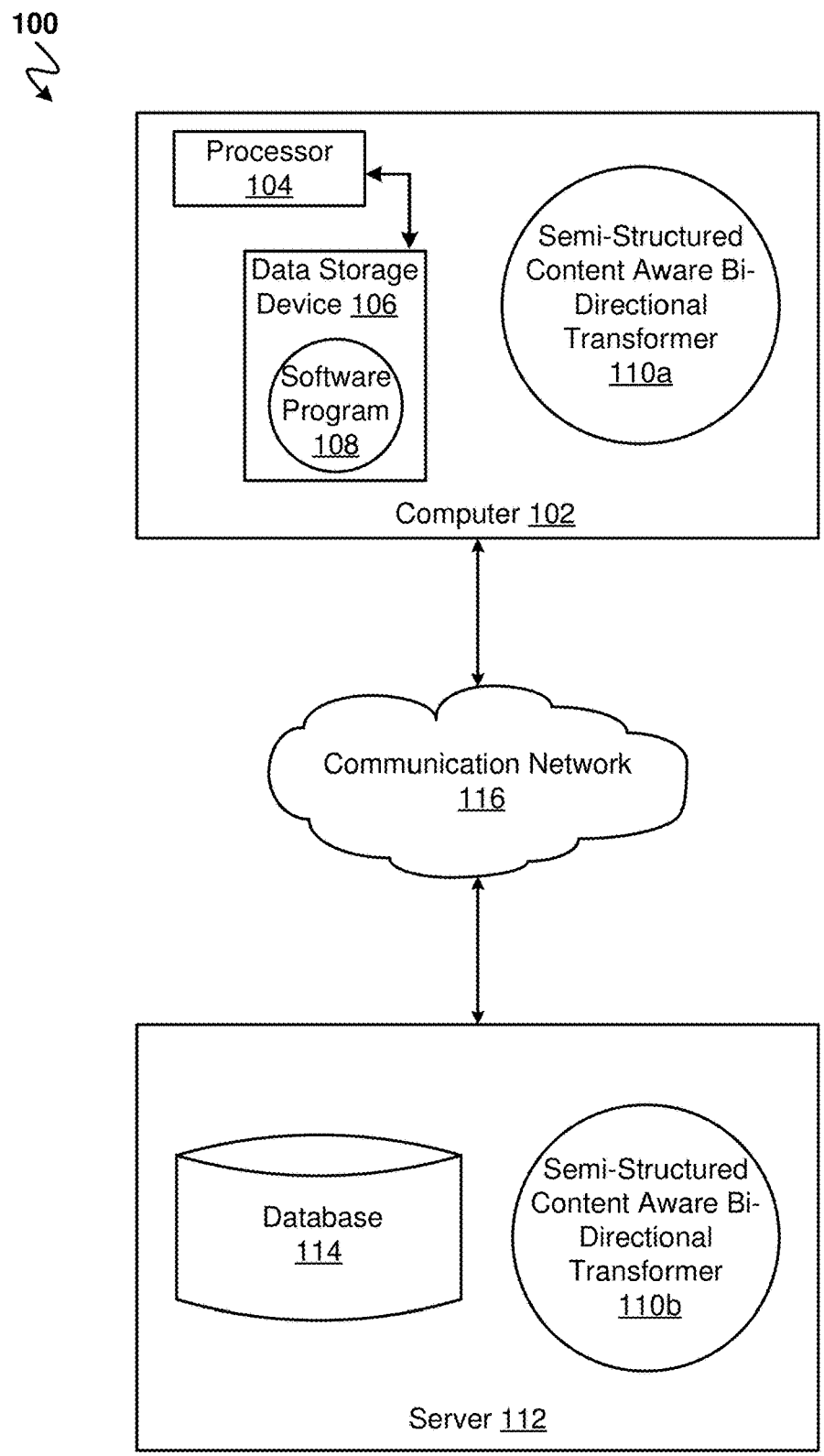
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a semi-structure content aware bi-directional transformer 110a. The networked computer environment 100 may also include a server 112 that is enabled to run a semi-structured content aware bi-directional transformer 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the semi-structured content aware bi-directional transformer 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the semi-structured content aware bi-directional transformer 110a, 110b (respectively) to perform a variety of NLP-related tasks on text that includes semi-structured content. The semi-structured content aware bi-directional transformer 110a, 110b may allow enhancement of multi-layer, bi-directional, transformers to understand and recognize hierarchy that is present in semi-structured content instead of treating the text solely as one long concatenation. Thus, the semi-structured content aware bi-directional transformer 110a, 110b may be implemented to enhance transformers such as BERT, RoBERTa, ALBERT, and BART.

Semi-structed text is not required to follow a tabular structure of data models associated with relational databases or other forms of data tables, but contains tags or other markers to separate semantic elements and enforce hierarchies of records and fields within the data. Semi-structured text is also known as self-describing structure. In semi-structured text, entities belonging to a certain class may be grouped together although they have different attributes. An order of the attributes is not required. Semi-structured data are prevalent on the Internet and on websites. Semi-structured text is often located in object-oriented databases. HyperText Markup Language (HTML), Extensible Markup Language (XML), JavaScript Object Notation (Json), and Markdown markup language are examples of languages which include semi-structured content. References to an "HTML" file may refer to new versions of HTML, e.g., an HTML5 file.

The semi-structured content aware bi-directional transformer 110a, 110b is explained in more detail below with respect to FIGS. 2-8.

Figure 2:
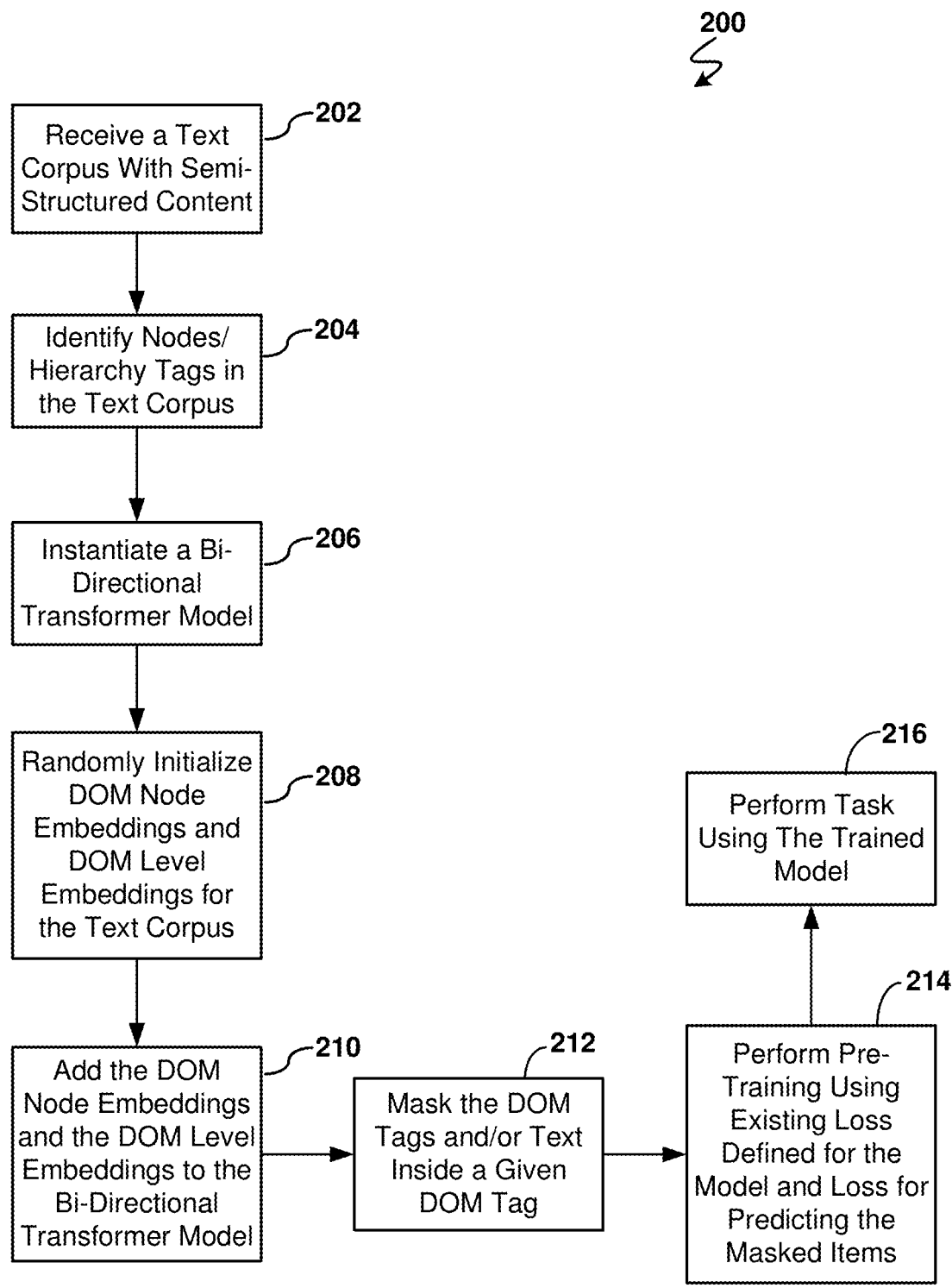
FIG. 2 is an operational flowchart illustrating a process for node embedding according to at least one embodiment.

Referring now to FIG. 2, an operational flowchart illustrating a semi-structured content analysis process 200 used by the semi-structured content aware bi-directional transformer 110a and 110b according to at least one embodiment is depicted.

In step 202 of the semi-structured content analysis process 200 shown in FIG. 2, a text corpus with semi-structured content is received. A user may upload the text corpus as a file into a web portal for the semi-structured content aware bi-directional transformer 110a, 110b. A user may load such a file into a web portal via the computer 102. The receiving may occur via the semi-structured content aware bi-directional transformer 110a receiving an uploaded file at the computer 102 or via the semi-structured content aware bi-directional transformer 110b at the server 112 receiving a text corpus file that was transmitted via the communication network 116, e.g., that was transmitted from the computer 102 through the communication network 116 to the server 112. As described above, the text corpus may be or may be part of an HTML file, an XML file, a Json file, a Markdown file, or some other file with semi-structured content which includes hierarchical organization for the text.

In step 204 of the semi-structured content analysis process 200 shown in FIG. 2, nodes and/or hierarchy tags in the text corpus are identified. The nodes and/or hierarchy tags that are identified may be from the semi-structured content of the text corpus that was received in step 202. Off-the-shelf libraries may be used to parse the received semi-structured input in order to identify the nodes and/or hierarchy tags in the received text corpus. Beautiful Soup is a Python® library for pulling data such as nodes and/or hierarchy tags out of HTML files and XML files. (Python® and all Python-based trademarks and logos are trademarks or registered trademarks of Python Software Foundation.) Tags from XML files are not predefined in the XML language. Tags from HTML files and Json files may be predefined according to the file language. For example, head, title, body, "p", "h1", and "div" are examples of predefined tags or nodes for an HTML file. For an XML file which includes data and text for a menu with a hierarchical structure, the nodes or hierarchy tags could include food name, price, calories, etc.

Thus, the semi-structured content aware bi-directional transformer 110a, 110b may include one or more language/text parsing programs. This identification of step 204 may be performed in an automated manner via the semi-structured content aware bi-directional transformer 110a, 110b.

A Document Object Model (DOM) interprets an XML or HTML document as a tree structure with nodes. Each node may be an object representing a part of the document. The DOM may represent a document with a logical tree. Each branch of the tree may end in a node. Each node may contain one or more objects.

In step 206 of the semi-structured content analysis process 200 shown in FIG. 2, a bi-directional transformer model is instantiated. This instantiation may include receiving a pre-trained bi-directional transformer model or training one or more algorithms to produce the bi-directional transformer model. The bi-directional transformer model may be accessed in the cloud via the communication network 116 or may be hosted on the server 112 and/or on the computer 102. The instantiation may include the creation of a real instance or particular realization of the bi-directional transformer model.

The bi-directional transformer model may implement multi-head self attention to compute attention between input tokens. With this aspect, given certain input tokens the transformer model can compute the weight or importance of each word for generating a next prediction. The transformer model may evaluate text bi-directionally, e.g., from left-to-right and right-to-left instead of from one of these directions only. A Masked Language Model task may be used by an encoder segment, e.g., during pre-training of the bi-directional transformer model, in order to predict pieces for a text that is input. The transformer model may be an implementation of a deep learning model that may include a neural network.

The bi-directional transformer model may include one or more encoder layers. Each of the layers may include sub-layers such as a self-attention layer and a feed-forward neural network layer. The encoder layers may help encode an embedding for words of a text corpus that is input. The self-attention layers may help the encoder use information from surrounding words for a particular word or word group when generating the embedding for that word or word group.

Embeddings generated by a transformer model for a text corpus may in practice include a few hundred to a few thousand dimensions. A word embedding may be an instance of a distributed representation, with each word being its own one-dimensional vector. In word embeddings, based on the machine learning, words with similar meanings may be generated to have similar vectors. The transformer model may be capable of generating an embedding model which may be a machine learning model with one or more embeddings. Word embeddings may be a dimensional space that may include vectors. When words or word portions from a text corpus are represented as vectors in a dimensional space, mathematical operations may be performed on the vectors to allow quicker and computer-based comparison of text corpora. The word embeddings may also reflect a size of a vocabulary of a respective text corpus fed into an embedding model, because a vector may be kept for each word in the vocabulary of the text corpus that is input. This vocabulary size is separate from the dimensionality. For example, a word embedding for a large text corpus may have one hundred dimensions and may have one hundred thousand respective vectors for one hundred thousand unique words. The dimensions for the word embedding may relate to how each word in the text corpus relates to other words in the text corpus.

Subsequent encoder layers may receive outputs from the previous encoder layers. A layer may generate multiple vectors, e.g., a query vector, a key vector, and a value vector, from an input vector, e.g., from an input word embedding. The vectors may be input into matrices who may be concatenated or interweaved to calculate an output. Encoder layers may also include a normalization sub-layer. The transformer model may include a plurality of encoder layers, e.g., twelve or twenty-four encoder layers. The transformer model may include feedforward-networks with a plurality of hidden units and attention heads, e.g., with 768 or 1024 hidden units, respectively, and, e.g., with 12 or 16 attention heads, respectively.

The bi-directional transformer model that is instantiated in step 206 may be pre-trained on vast amounts of text data, e.g., on one or more non-semi-structured text corpuses. For example, vast amounts of text data from an online encyclopedia that may be edited by the public may be input into a deep learning model in order to produce the bi-directional transformer model. Text from an entire book or a set of books may be input or fed into the deep learning model in order to train and produce the bi-directional model. The bi-directional transformer model may use the text and masked portions in the input text in order to learn to predict text and text relationships.

The bi-directional transformer model may be generated and trained using bi-directional embeddings that include one or more of token embeddings, segment embeddings, and positional embeddings. FIGS. 3-8 show examples of these different embedding types that were generated from semi-structured content. Pre-training of the transformer model may be performed using unstructured or non-semi-structured text, e.g., text from an encyclopedia or book, and by generating embeddings from the text that lacks the semi-structured content.

For token embeddings, a vector may be generated for each or some of the words or word pieces of the text corpus that is input. The vector may be unique for each word. A word piece may be a base of a word, so that similar or the same vectors may be generated for words that have the same meaning but have, for example, different conjugation due to association with different subjects or objects in a text group, e.g., in a sentence.

The pre-training of the bi-directional transformer model may include masking certain token embeddings to help the model learn to predict which word may appear in a sentence. Such masking has been referred to as a Cloze task. Due to the entire text corpus having been received for training, the model knows the final word that is hidden via the mask. The model may minimize a loss function to cause the transformer model to more accurately predict which word has been masked. Some portion of the words or tokens of a testing text corpus may be masked, e.g., thirty percent or less of the words or tokens may be masked. The loss minimization may include a softmax probability calculation.

For a positional embedding, a positional embedding is generated indicating the position of a word or a word piece within a larger text. For example, for a combination of two sentences that together total eighteen words, positional embeddings may include a number running from zero to eighteen that represents the position of a particular word within the eighteen-word total group of text. The "zero" positional embedding may be for a "CLS" token which may be included at the beginning of each text group that is input into the model. This "CLS" token may represent the word "classification" and may help a program recognize the beginning of a new text group.

The bi-directional transformer model may also include next-segment prediction. The text may be broken down into segments and may be input as segment-pairs into the model that is being trained. With this next-segment prediction, the context of a word may be more readily incorporated into relationships with the text corpus as a whole and not only with other words within the same segment. For flowing text, sentences are examples of segments. Thus, for free-flowing text the segment-pairs may be a first sentence paired with a second sentence. Segment pairs may be separated in the pairing with a separator token, e.g., with a "SEP" token. A new embedding layer may be implemented that indicates to which segment of the segment pair a word or word piece belongs. For example, this segment embedding layer may have two values for a segment pair. Each token would, for example, have an A value or a B value in this segment layer embedding. Those tokens with the A value may come from a first segment of the pair, while those tokens with the B value may come from the second segment of the pair. The training for the bi-directional transformer model with the next-segment prediction may include feeding some segment pairs with a correct sequence pairing from the text corpus, while other segment pairs are input while having random sequences paired together. The correct sequence means that a sentence A directly followed by a sentence B in the text would pair sentence A with sentence B. In the random sequences, sentence A may be paired with a sentence G, whereby sentence G precedes sentence A in the text or is distanced from sentence A with other sentences or segments between itself and sentence A in the text. The bi-directional model may be trained to recognize whether a segment pair has the correct sequence of its two segments.

Various output layers may be added to a bi-directional transformer model in order to perform certain natural language processing tasks. Natural language inference, paraphrasing, named entity recognition, question answering, sentence classification, sentence pair classification, and sentence tagging are examples of tasks that may be performed when an additional output layer is added to a bi-directional transformer model.

In step 208 of the semi-structured content analysis process 200 shown in FIG. 2, DOM node embeddings and DOM level embeddings for the text corpus are randomly initialized. The DOM node embeddings and the DOM level embeddings are based on the nodes/hierarchy tags that are identified in step 204 of the semi-structured content analysis process 200. The DOM node embeddings may include the node names or hierarchy tag names that are identified in step 204. The DOM level embeddings may be scalar numbers that correspond to a node depth level of a node or a hierarchy tag depth level of a hierarchy tag within the hierarchy of the semi-structured content.

FIGS. 3-8 show examples of DOM node embeddings and DOM level embeddings being generated for a text corpus that includes semi-structured content.

Figure 3:
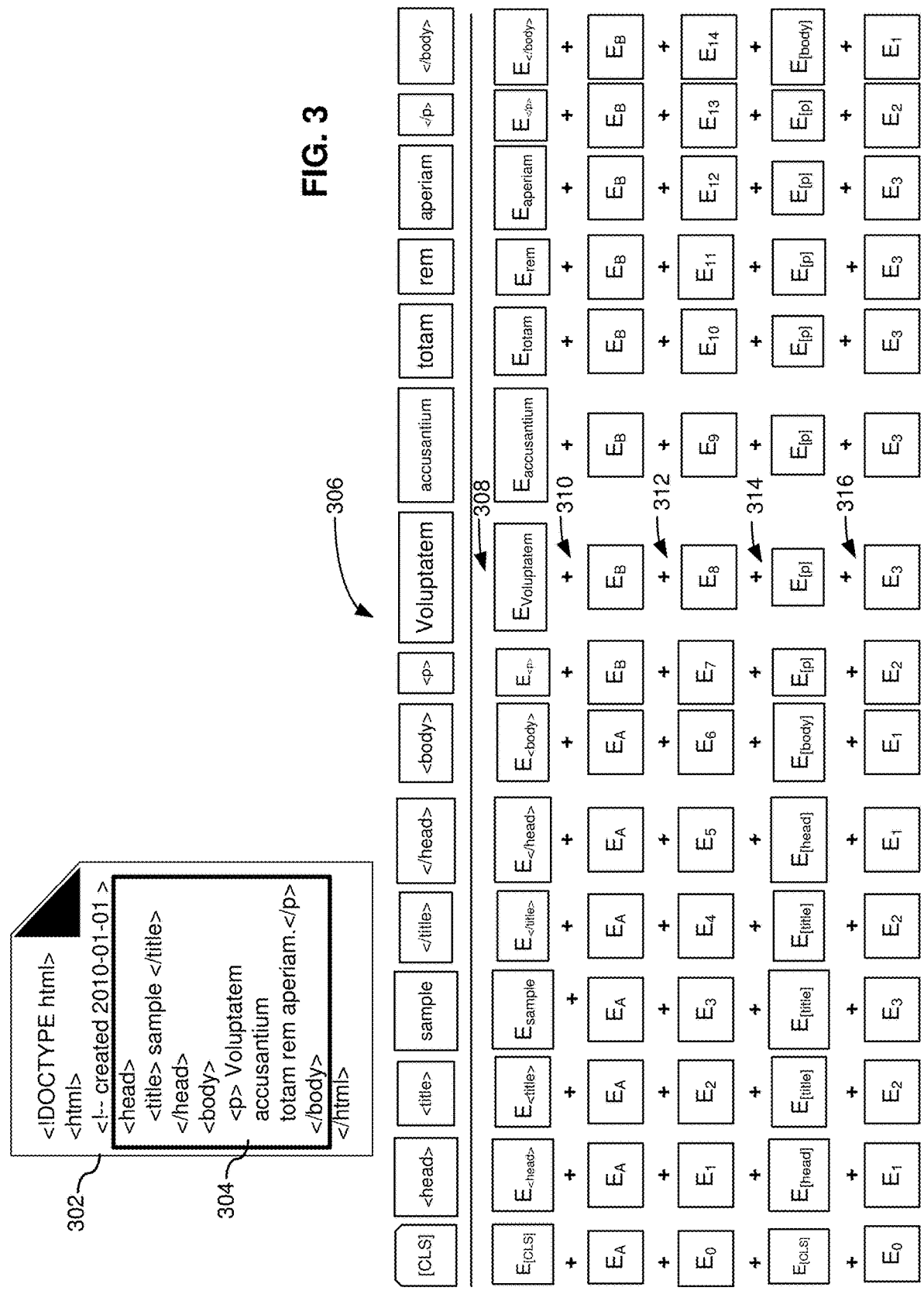
FIG. 3 shows an example of embedding for an HTML document according to at least one embodiment.
Figure 4:
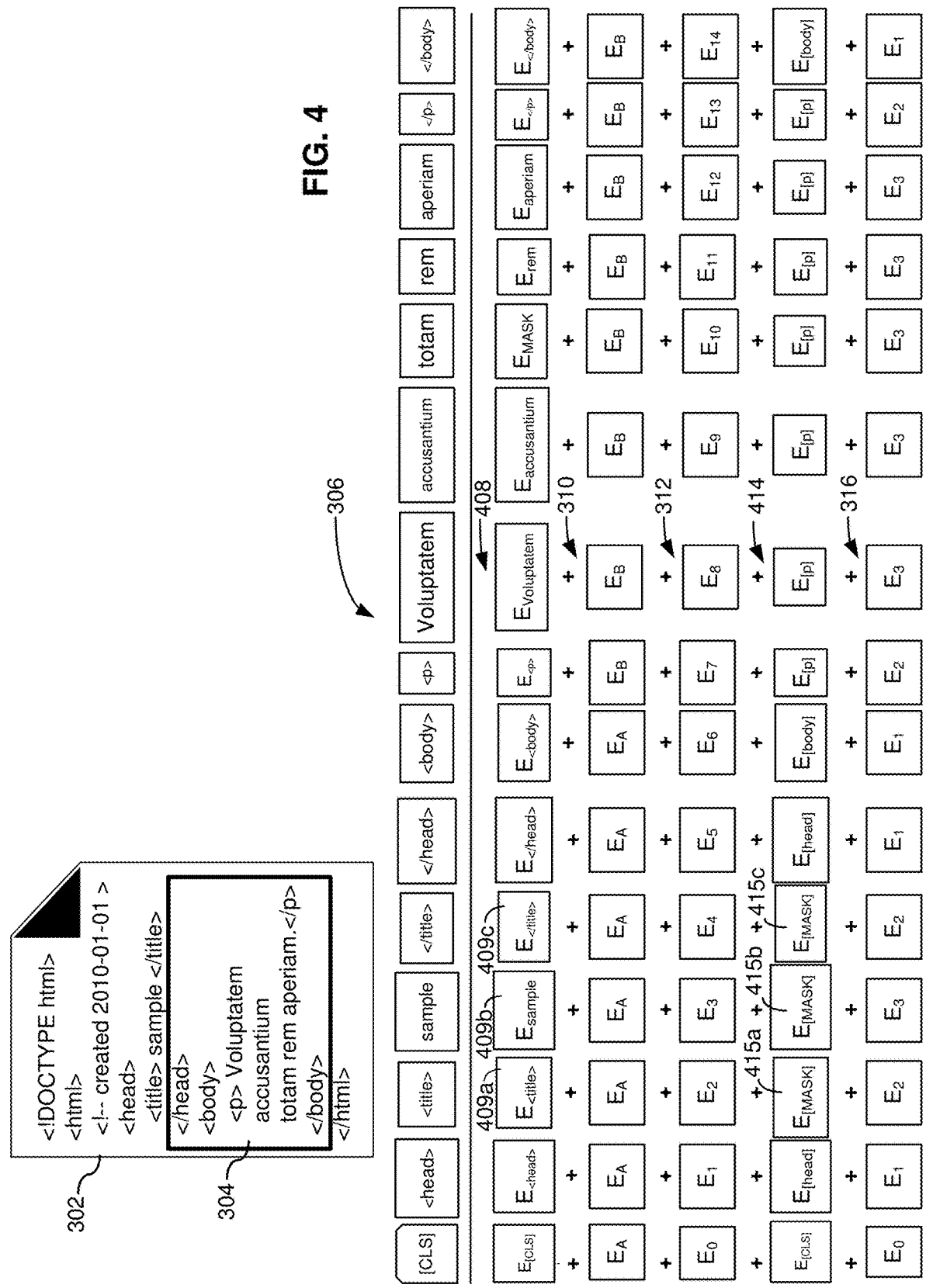
FIG. 4 shows the embedding embodiment of FIG. 3 with some embeddings being masked.

FIGS. 3 and 4 show such embeddings being generated from a first HTML text corpus 302. FIG. 3 shows a set of first DOM node embeddings 314 and a set of first DOM level embeddings 316 which were generated from the first HTML text corpus 302, in particular from a first input portion 304 from the first HTML text corpus 302, that was input into and received by the semi-structured content aware bi-directional transformer 110*a*, 110*b* in this embodiment.

Figure 5:
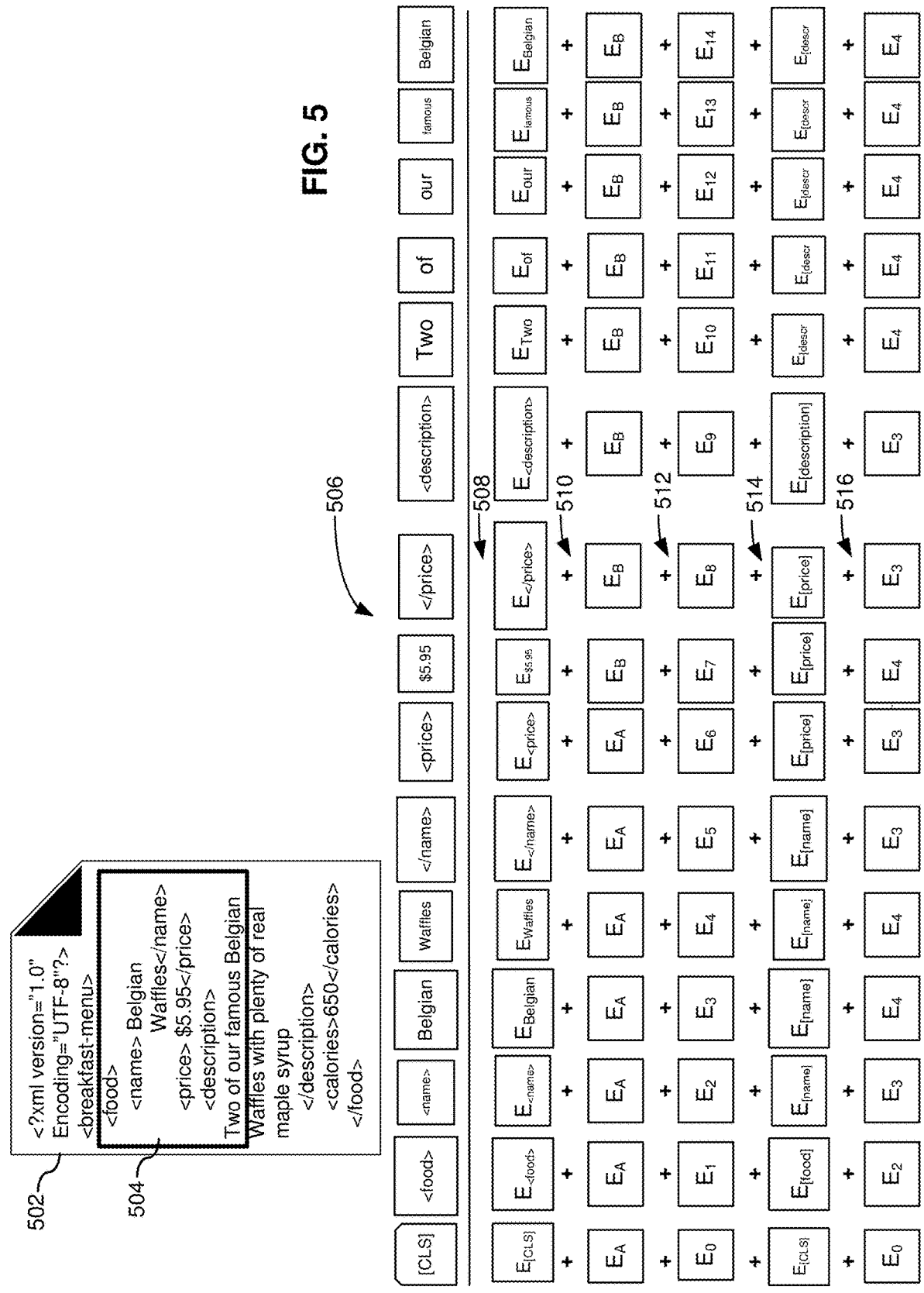
FIG. 5 shows an example of embedding for an XML document according to at least one embodiment.
Figure 6:
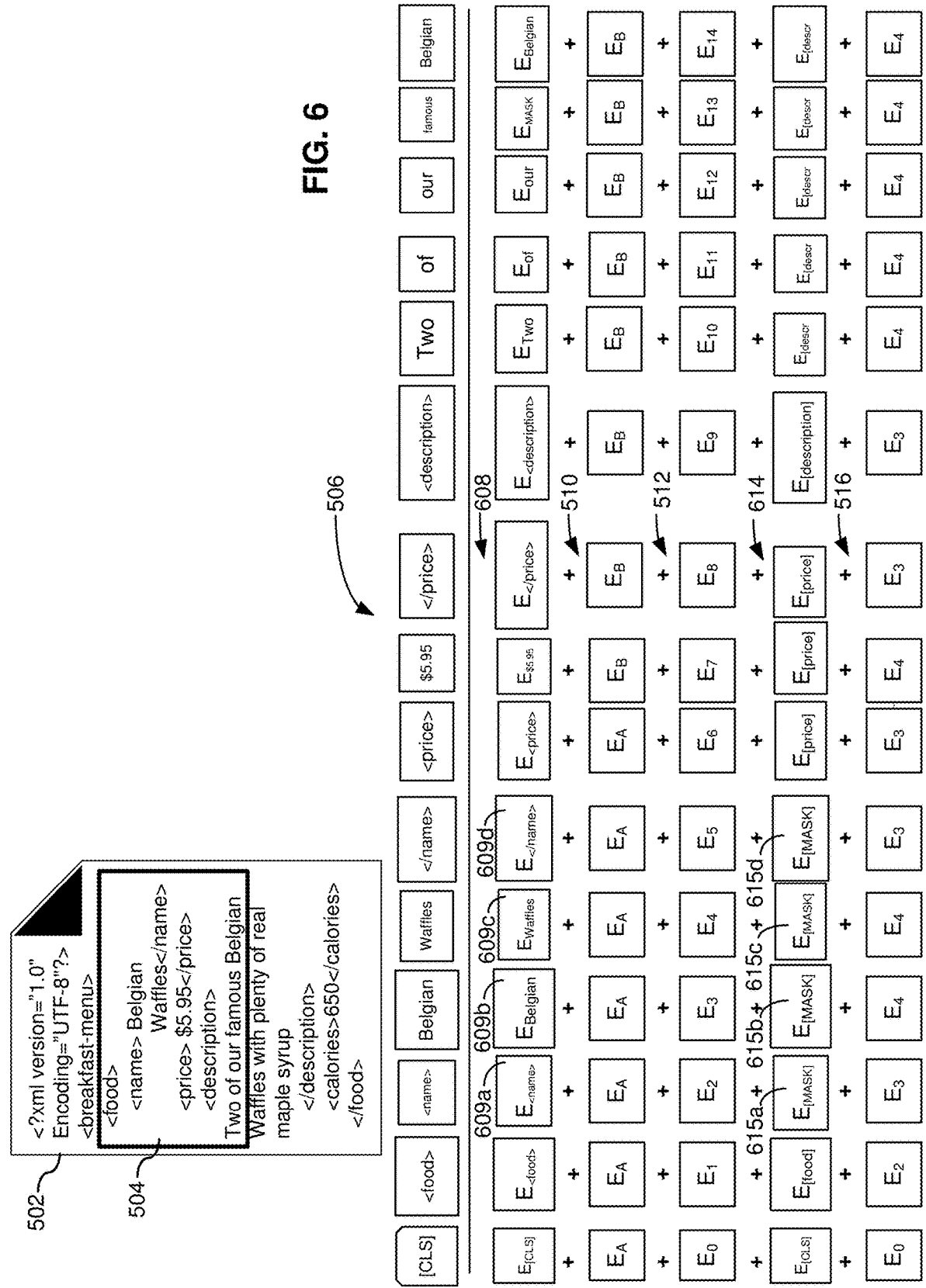
FIG. 6 shows the embedding embodiment of FIG. 5 with some embeddings being masked.

FIGS. 5 and 6 show such embeddings being generated from a first XML text corpus 502. FIG. 5 shows a set of second DOM node embeddings 514 and a set of second DOM level embeddings 516 which were generated from the first XML text corpus 502, in particular from a second input portion 504 from the first XML text corpus 502, that was input into and received by the semi-structured content aware bi-directional transformer 110*a*, 110*b* in this XML embodiment that is illustrated.

Figure 7:
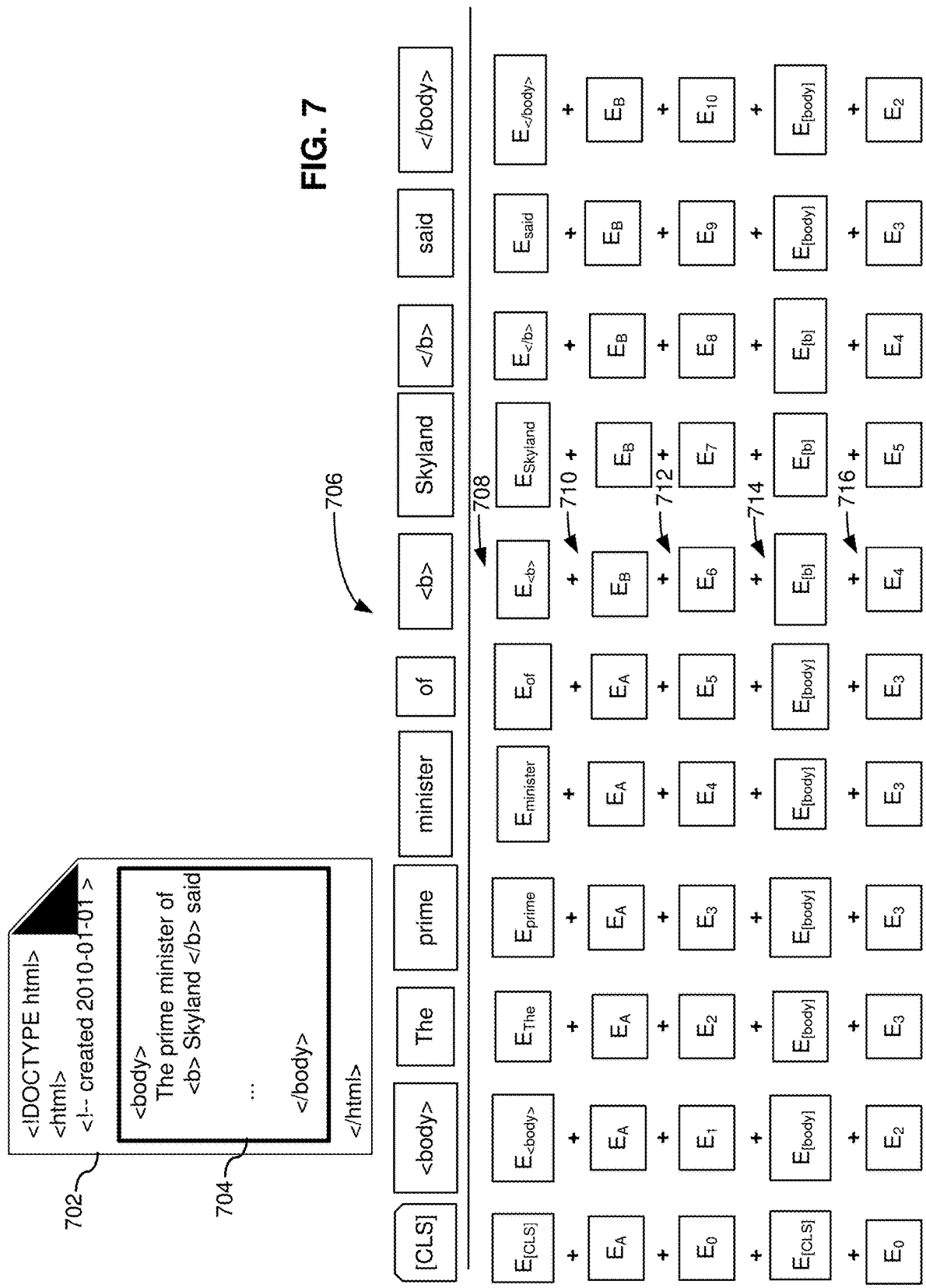
FIG. 7 shows an example of embedding for another HTML document according to at least one embodiment.
Figure 8:
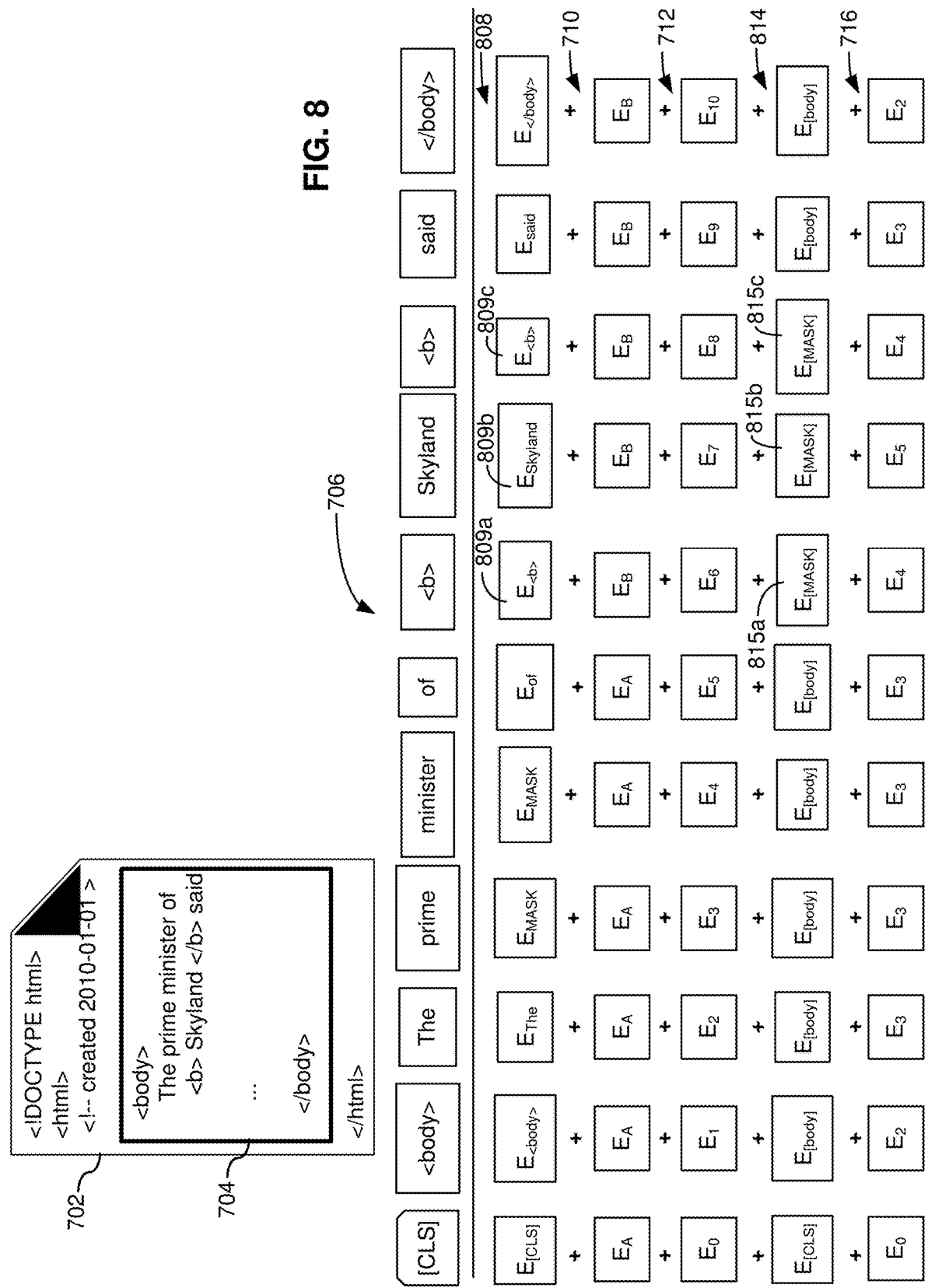
FIG. 8 shows the embedding embodiment of FIG. 7 with some embeddings being masked.

FIGS. 7 and 8 show such embeddings being generated from a second HTML text corpus 702. FIG. 7 shows a set of third DOM node embeddings 714 and a set of third DOM level embeddings 716 which were generated from the second HTML text corpus 702, in particular from an input portion 704 from the second HTML text corpus 702, that was input into and received by the semi-structured content aware bi-directional transformer 110*a*, 110*b* in the further embodiment that is shown.

The HyperText Markup Language (HTML) is a standard markup language for documents designed to be displayed in a web browser. The language includes not only the words to display in the web browser but also nodes which instruct the web browser regarding the manner in which words are to be displayed on a display screen.

The first HTML text corpus 302 includes nodes or hierarchy tags which would cause a web browser to display in a head portion of the web browser the phrase "sample" and to cause a body portion of the web browser to display a Latin phrase "Voluptatem accusantium totam rem aperiam".

If such an HTML text corpus were input into a traditional bi-directional transformer model, the model would treat each node or hierarchy tag equally as it would treat the display words, may have a reduced efficiency, and would be unable to predict node types or hierarchy tags for new hierarchy tag names or other terms that are input.

With the semi-structured content analysis process 200, the semi-structured content aware bi-directional transformer 110*a*, 110*b* may be able to learn to recognize the semi-structured content format for a particular user. Thus, a user who trains a model using the semi-structured content analysis process 200 may subsequently input terms into the trained model and the trained model may accurately predict a node type of that term, whereby the node type is from the semi-structured content of a user/data set. This node type that may be predicted may include a name of the node and/or a depth level of the node in the hierarchy of the semi-structured content.

FIG. 3 shows a first input portion 304 that is input into the semi-structured content aware bi-directional transformer 110*a*, 110*b*. As a part of step 208, the semi-structured content aware bi-directional transformer 110*a*, 110*b* may generate a set of first DOM node embeddings 314 and a set of first DOM level embeddings 316 based on the first input portion 304. FIG. 3 shows that the first DOM node embeddings 314 are named after the hierarchy tags or DOM node names, e.g., have names of "title", "head", "body", and "p", from the first HTML text corpus 302. The DOM level embeddings include an integer from 0 to 3 based on the node depth level for the respective corresponding node in the first HTML text corpus 302.

These first DOM node embeddings 314 and the first DOM level embeddings 316 may be included in the bi-directional transformer model along with other embeddings in order to produce the trained model for semi-structured content natural language processing.

Embeddings are weights and may be randomly initialized for machine learning models. A random initialization helps break symmetry and improves accuracy of a machine learning model. Weights may be initialized close to zero and randomly. By changing the weights to have an amount that is not zero, symmetry amongst the neurons or in a layer may be broken and every neuron performs a different computation instead of the same computation. Random initialization functions are available in machine learning model programming languages.

In step 210 of the semi-structured content analysis process 200 shown in FIG. 2, the DOM node embeddings and the DOM level embeddings are added to the bi-directional transformer model. FIGS. 3-8 show examples of DOM node embeddings and DOM level embeddings being included with other embeddings in order to enhance the bi-directional transformer model to be able to interpret semi-structured content. The DOM node embeddings and the DOM level embeddings may be summed and input in a summed form into the bi-directional transformer model. The summation may include one or more of the token embeddings segment embeddings, and positional embeddings that were described earlier.

For example, FIG. 3 shows that the first DOM node embeddings 314 and the first DOM level embeddings 316 are included with first token embeddings 308, first segment embeddings 310, and first positional embeddings 312 in order to train a bi-directional transformer model. The pre-trained bi-directional transformer model that is instantiated in step 206 may be ready to generate the first token embeddings 308, the first segment embeddings 310, and the first positional embeddings 312 based on the content of the first input portion 304 of the first HTML text corpus 302 and based on the character and design of the pre-trained bi-directional transformer model. The first token embeddings 306 may be a one-to-one character match of each input phrase of the first input portion 304. Alternatively, tokens may be generated for word portions of certain words of the text. The first segment embeddings 310 may include information to indicate from which segment of text in the text corpus the term falls, e.g., from a segment A or from a segment B. A separator token, e.g., "[SEP]", may in some embodiments be generated for the token embeddings to indicate the transition from a first segment, e.g., a first sentence, to a second segment, e.g., a second sentence, of a segment pair. As the first input portion 304 has fourteen word pieces, the first positional embeddings may include fourteen, fifteen, or sixteen positional counts for the positional embeddings. The first positional embeddings 312 are shown in FIG. 3 with fifteen counts, as an extra spot is shown for the CLS token. In other embodiments, a positional count may be added for a separator token that separates two segments of a segment pair. The first DOM node embeddings 314, the first DOM level embeddings 316, the first token embeddings 308, the first segment embeddings 310, and the first positional embeddings 312 may be summed together and input in the summed form into the bi-directional transformer model. The generation of the embeddings and the summation may occur as lead procedures of the bi-directional transformer model.

FIG. 5 shows that second DOM node embeddings 514 and second DOM level embeddings 516 are included with second token embeddings 508, second segment embeddings 510, and second positional embeddings 512 in order to train a bi-directional transformer model. The pre-trained bi-directional transformer model that is instantiated in step 206 may be ready to generate the second token embeddings 508, the second segment embeddings 510, and the second positional embeddings 512 based on the content of the second input portion 504 of the first XML text corpus 502 and based on the character and design of the pre-trained bi-directional transformer model. The second token embeddings 506 may be a one-to-one character match of each input phrase of the second input portion 504. Alternatively, tokens may be generated for word portions of certain words of the text. The second segment embeddings 510 may include information to indicate from which segment of text in the text corpus the term is disposed, e.g., from a segment A or from a segment B. A separator token may in some embodiments be generated for the token embeddings to indicate the transition from a first segment, e.g., a first sentence, to a second segment, e.g., a second sentence, of a segment pair. As the second input portion 504 has fourteen word pieces, the corresponding positional embeddings may include fourteen, fifteen, or sixteen positional counts for the positional embeddings. The second positional embeddings 512 are shown in FIG. 5 with fifteen counts, as an extra spot is shown for the CLS token. In other embodiments, a positional count may be added for a separator token that separates two segments of a segment pair. The second DOM node embeddings 514, the second DOM level embeddings 516, the second token embeddings 508, the second segment embeddings 510, and the second positional embeddings 512 may be summed together and input in the summed form into the bi-directional transformer model. The generation of the embeddings and the summation may occur as lead procedures of the bi-directional transformer model.

FIGS. 5 and 6 show the first XML text corpus 502 has semi-structured content that includes a menu—in this case a breakfast menu.

FIG. 7 shows that the third DOM node embeddings 714 and the third DOM level embeddings 716 are included with third token embeddings 708, third segment embeddings 710, and third positional embeddings 712 in order to train a bi-directional transformer model. The pre-trained bi-directional transformer model that is instantiated in step 206 may be ready to generate the third token embeddings 708, the third segment embeddings 710, and the third positional embeddings 712 based on the content of the third input portion 704 of the second HTML text corpus 702 and based on the character and design of the pre-trained bi-directional transformer model. The third token embeddings 706 may be a one-to-one character match of each input phrase of the third input portion 704. Alternatively, tokens may be generated for word portions of certain words of the text. The third segment embeddings 710 may include information to indicate from which segment of text in the text corpus the term is disposed, e.g., from a segment A or from a segment B. A separator token may in some embodiments be generated for the token embeddings to indicate the transition from a first segment, e.g., a first sentence, to a second segment, e.g., a second sentence, of a segment pair. As the third input portion 704 has ten word pieces, the corresponding positional embeddings may include ten, eleven, or twelve positional counts for the positional embeddings. The third positional embeddings 712 are shown in FIG. 7 with eleven counts, as an extra spot is shown for the CLS token. In other embodiments, a positional count may be added for a separator token that separates two segments of a segment pair. The third DOM node embeddings 714, the third DOM level embeddings 716, the third token embeddings 708, the third segment embeddings 710, and the third positional embeddings 712 may be summed together and input in the summed form into the bi-directional transformer model. The generation of the embeddings and the summation may occur as lead procedures of the bi-directional transformer model.

In step 212 of the semi-structured content analysis process 200 shown in FIG. 2, the DOM tags and/or text inside a given DOM tag is/are masked. This masking may be performed by the semi-structured content aware bi-directional transformer 110a, 110b replacing certain node names from the DOM node embeddings with MASK tokens so that the node name is anonymized. Some, e.g., half or fewer, of the DOM node embeddings may be masked in step 212. In some embodiments, fifteen percent or fewer of the DOM node embeddings may be masked in step 212.

FIG. 4 shows the tokens of FIG. 3, but with certain DOM nodes having been masked so that a first masked DOM node embedding layer 414 is formed to replace the first DOM node embeddings 314. FIG. 4 shows a first HTML DOM node mask 415a, a second HTML DOM node mask 415b, and a third HTML DOM node mask 415c that replaced three of the "Title" DOM nodes that were shown in FIG. 3.

FIG. 6 shows the tokens of FIG. 5, but with certain DOM nodes having been masked so that a second masked DOM node embedding layer 614 is formed to replace the second DOM node embeddings 514. FIG. 6 shows a first XML DOM node mask 615a, a second XML DOM node mask 615b, a third XML DOM node mask 615c, and a fourth XML DOM node mask 615d that replaced four of the "name" nodes/hierarchy tags that were shown in FIG. 5.

FIG. 8 shows the tokens of FIG. 7, but with certain DOM nodes having been masked so that a third masked DOM node embedding layer 814 is formed to replace the third DOM node embeddings 714. FIG. 8 shows a fourth HTML DOM node mask 815a, a fifth HTML DOM node mask 815b, and a sixth HTML DOM node mask 815c that have replaced three of the DOM nodes that were shown in FIG. 7, namely a "b" DOM node generated from a bold symbol "<b>" text input, a "b" DOM node generated from a "Skyland" text input, and a "b" symbol generated from a bold symbol ending "</b>" text input. Thus, FIG. 8 shows an example of performing a mask for a first node and a header node associated with the first node. The "b" header node corresponding to the "<b>" header that is masked is associated with the "b" node corresponding to the term "Skyland" that is also masked.

The actual node values that are so-to-say "covered" by the masked portions may be used in step 214 in a final part of the pre-training in order to train the model to understand the semi-structured content.

Similarly masking may be performed with respect to the tokens. Some of the tokens may be masked to help the transformer model understand and learn the vocabulary of the text corpus that has semi-structured content or that, in pre-training, lacks semi-structured content.

The summation of various embeddings may occur after the masking is performed, so that the embeddings in a summed form that are input or used in the bi-directional transformer model include the maskings. Thus, the masking of step 212 may be performed before or in conjunction with the steps 208 and 210 so that the maskings are used when the embeddings are generated, summed, and input in summed form into the bi-directional transformer model.

The masking may include masking of node names and of text within the hierarchical nodes. The node embeddings and the level embeddings may be generated from the masked text in addition to the masked node names. The bi-directional transformer model may be trained on the first text corpus by reducing loss from the bi-directional transformer model predicting the masked text.

In step 214 of the semi-structured content analysis process 200 shown in FIG. 2, pre-training is performed using existing loss defined for the model and loss for predicting the masked items. This pre-training may include the transformer model determining or learning good values for the weights in the embedding layers. The machine learning algorithm may perform the pre-training by generating and examining many examples and by attempting to find a transformer model that minimizes loss. Such machine learning training has been referred to as empirical risk minimization. For the masked portions from step 212, the pre-training seeks to define a model which would correctly predict the node types that were masked and, therefore, were missing during the input of tokens into the transformer model. The prediction of node types may include a name of the node and/or a depth level of the node in the hierarchy. The pre-training may repeat weight selection and word prediction until a loss function is minimized. An increase in loss is a result of a worse prediction. The loss may indicate how inaccurate the prediction of the model was for an example. A correct prediction may mean that the loss is zero. The loss increases as the predictions become more inaccurate. Training the model with this loss minimization seeks to find a set of weights and biases that have low loss, on average, across all examples.

The existing loss for the model may relate to masks that were applied to the inputs for the tokens and training the machine learning model to minimize loss for the token predictions. The DOM loss may relate to the DOM node masks and training the machine learning model to minimize loss for DOM node predictions. The trained model may be produced when both the existing loss, i.e., the loss from the token predictions, and the DOM node prediction loss are minimized. The model may use linear regression models and related features such as squared loss and mean square error to perform the loss minimization determinations for the predictions.

For the example shown in FIGS. 3 and 4, the weights and biases for the transformer model may be chosen well by the model in the pre-training when the model is best able to predict that the first, second, and third HTML DOM node masks 415a, 415b, and 415c mask a "title" node/hierarchy tag and when the model is best able to predict that the first, second, and third masked tokens 409a, 409b, 409c are for the words "<title>", "sample", and "</title>", respectively.

For the example shown in FIGS. 5 and 6, the weights and biases for the transformer model may be chosen well by the model in the pre-training when the model is best able to predict that the first, second, third, and fourth XML DOM node masks 615a, 615b, 615c, and 615d mask a "name" node/hierarchy tag and when the model is best able to predict that the fourth, fifth, sixth, and seventh masked tokens 609a, 609b, 609c, and 609d are the for the words "<name>", "Belgian", "waffles", and "</name>", respectively.

For the example shown in FIGS. 7 and 8, the weights and biases for the transformer model may be chosen well by the model in the pre-training when the model is best able to predict that the fifth, sixth, and seventh HTML DOM node masks 815a, 815b, and 815c each mask a (b) node/hierarchy tag and when the model is best able to predict that the eighth, ninth, and tenth masked tokens 809a, 809b, 809c are for the word or word pieces "<b>", "Skyland", and "<b>", respectively.

FIGS. 7 and 8 show examples of node names from the third DOM node embeddings 714 being equal despite landing in different node depth levels. For example, a DOM node embedding that is shown second-from-the-left has a node name of "$E_{[body]}$" and is at a second node depth level ("$E_2$"), while the neighboring DOM node embedding to the right also has a node name "$E_{[body]}$" but is at a third node depth level ("$E_3$") in the hierarchy.

The embodiments of FIGS. 3-8 show that for at least some embodiments masking for token embeddings may be performed to match the maskings for the DOM node embeddings. For example, for a masking made in a DOM node embedding the corresponding token node from the relevant word or word piece that is input would also be masked.

In step 216 of the semi-structured content analysis process 200 shown in FIG. 2, a task is performed using the trained model. The task may include inputting one or more terms into the trained model and receiving a node prediction for the terms. For example, if the model is trained in the semi-structured content analysis process 200 to learn the semi-structured content of menus, then the trained model may be able to accurately predict which node (e.g., food name, price, calories) of the DOM tree for the menu corresponds to the input word or words. If the term "pancake" is entered into the model, the model may predict whether the entry of the term is attempting to refer to a food tag, a name tag, or a breakfast menu tag, etc., according to previous usage of a data owner or data user in the previous semi-structured content. This prediction may include a name of the node and/or a depth level of the node. This predictive ability may help the program in speeding processing for creation of new menus, as the program may help direct the user to the proper node instead of causing the user to manually review all possible nodes and manually select the appropriate node type.

In another example similar in type, a health center, e.g., a hospital, may include a collection of health information such as patient names, patient conditions, medication names, medication dosages, nurses, etc. that is/are stored in a form having semi-structured content. One or more text corpuses that include the semi-structured content and this health information may be input into the model for training, so that subsequently words may be input into the trained model and the model may quickly predict which node type is appropriate for a certain input word or phrase. This predictive ability may help the program in speeding processing for new health information that is input, because the program may help direct the user to the proper node instead of causing the user to manually review all possible nodes and manually select the appropriate node type.

Different users of text with semi-structured content will usually have a unique vocabulary set for text that is inbetween the tags, so training the model for a specific customer by feeding in previous semi-structured content from that specific customer can be valuable. Different customers might have similar or dissimilar hierarchies in the semi-structured content and also might have similar or dissimilar vocabulary sets in the semi-structured content.

The task of step 216 may include comparing multiple snippets of files with semi-structured content, e.g., comparing multiple snippets of HTML files and/or XML files.

The task of step 216 may include performing reading comprehension on raw semi-structured text content, e.g., on raw HTML data or on raw XML data. Given a query and a passage which are represented as a DOM tree, the trained model may be able to better find a factoid span in the text, due to additional training that was performed using the hierarchy.

The task of step 216, in another embodiment, may include computing a similarity level between two semi-structured texts. The semi-structured content aware bi-directional transformer 110a, 110b can understand and interpret the hierarchy of semi-structured texts in order to compute the similarity between two semi-structured texts. The semi-structured content aware bi-directional transformer 110a, 110b may make a similarity determination or provide a similarity score using a statistical analysis when two semi-structured texts are input into the semi-structured content aware bi-directional transformer 110a, 110b. This similarity determination may include inputting a second text corpus and a third text corpus into the trained model, with each of the second text corpus and the third text corpus having respective semi-structured content. A similarity score from the trained model may be received as output from the trained model. The similarity score may indicate a similarity between the second text corpus and the third text corpus.

It may be appreciated that FIGS. 2-8 provide only illustration of certain embodiments and do not imply any limitations with regard to how different embodiments may be implemented. Many modifications to the depicted embodiment(s), e.g., to a sequence of steps that are depicted, may be made based on design and implementation requirements.

Figure 9:
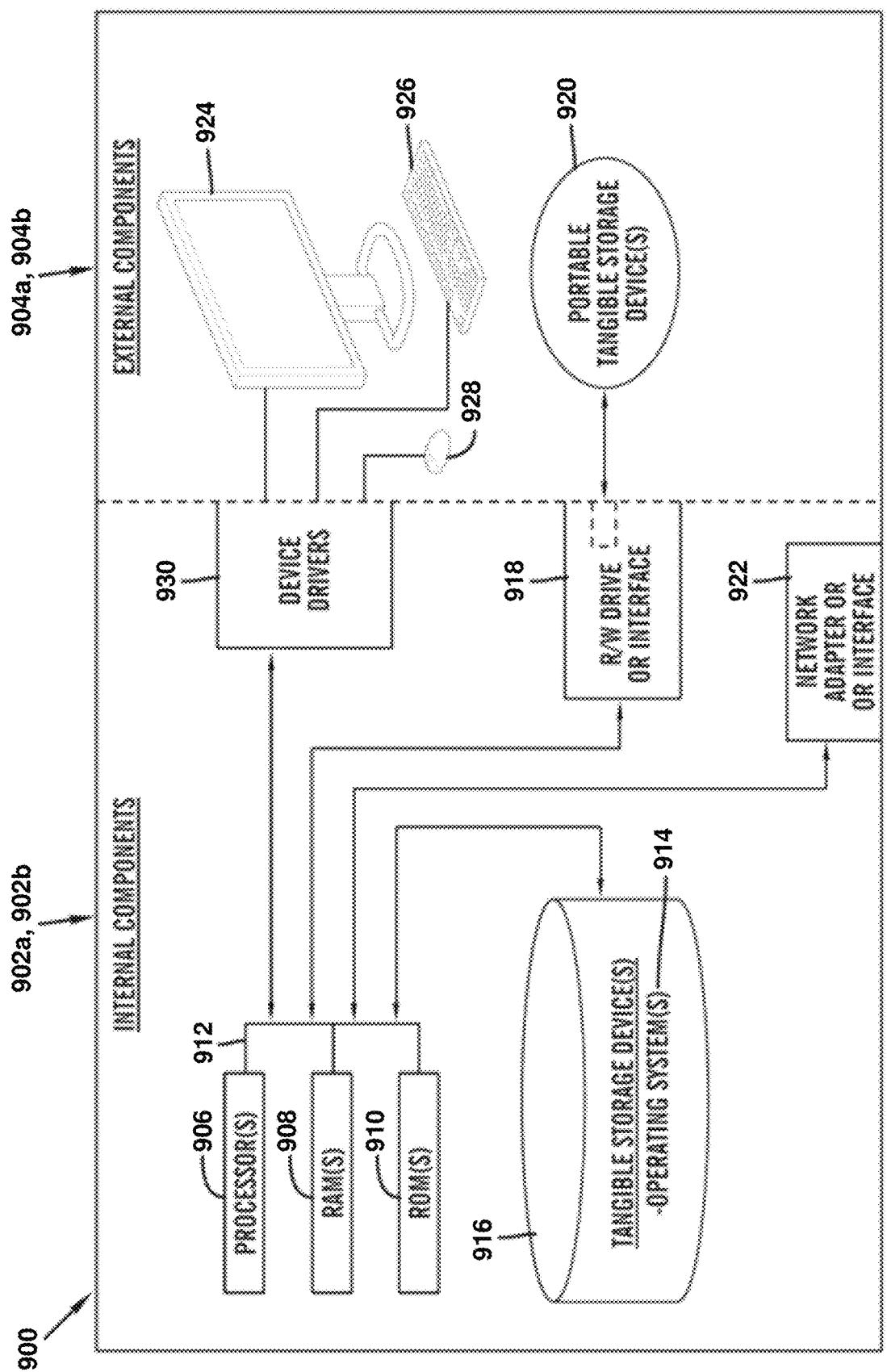
FIG. 9 is a block diagram of internal and external components of computers and servers depicted in FIG. 1 according to at least one embodiment.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, 902b and external components 904a, 904b illustrated in FIG. 9. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the semi-structured content aware bi-directional transformer 110a in client computer 102, and the semi-structured content aware bi-directional transformer 110b in server 112, may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk, or semiconductor storage device. A software program, such as the software program 108 and the semi-structured content aware bi-directional transformer 110a and 110b can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The software program 108 and the semi-structured content aware bi-directional transformer 110a in client computer 102 and the semi-structured content aware bi-directional transformer 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the semi-structured content aware bi-directional transformer 110a in client computer 102 and the semi-structured content aware bi-directional transformer 110b in network server computer 112 are loaded into the respective hard drive 916. The network may comprise copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
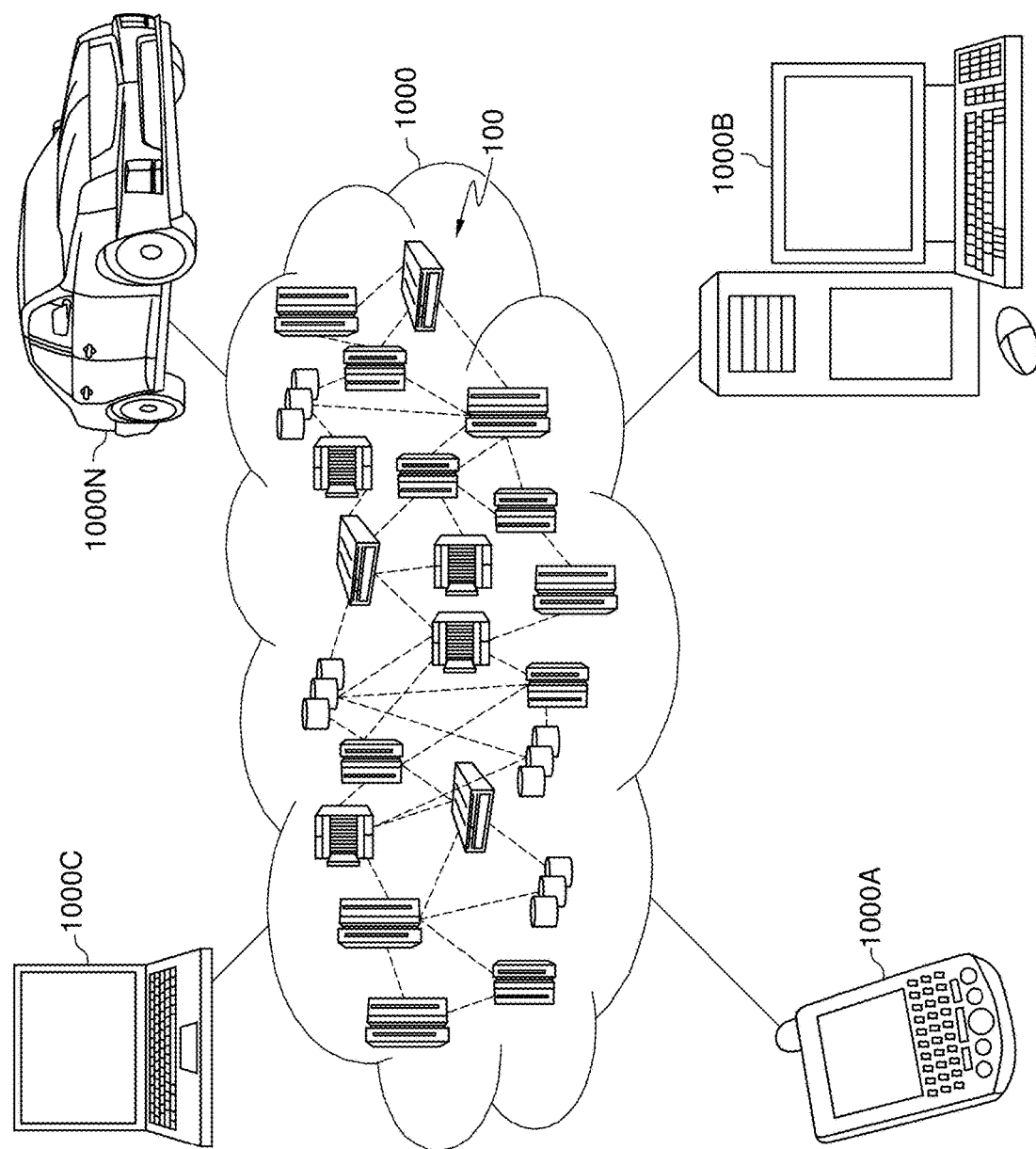
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
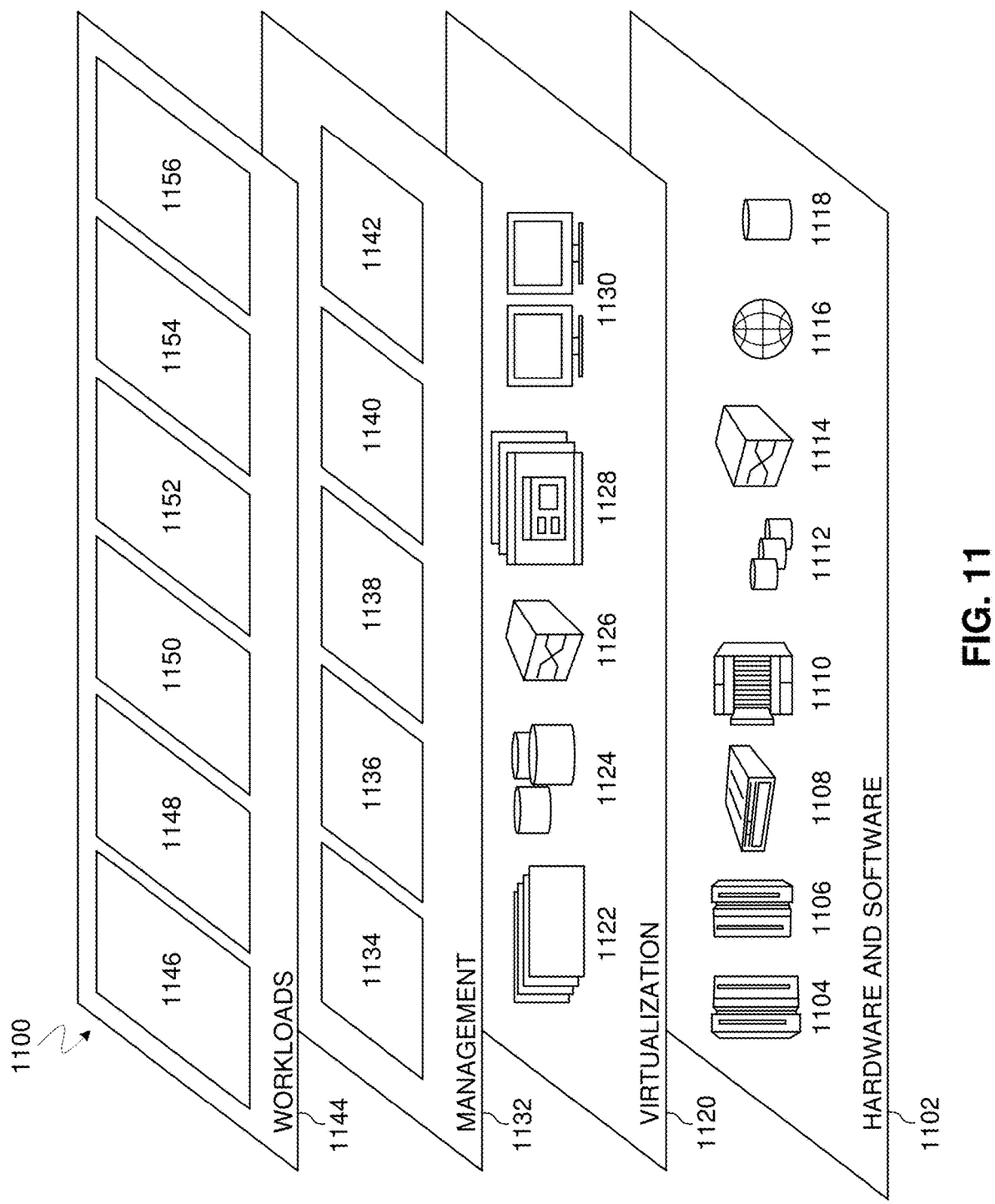
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and semi-structured text content analysis 1156. A semi-structured content aware bi-directional transformer 110a, 110b provides a way to enhance bi-directional transformer models to help them interpret and predict nuances of text that has semi-structured content.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for natural language processing, the method comprising:
    receiving a first text corpus that comprises semi-structured content comprising hierarchical nodes;
    masking some of the hierarchical nodes;
    generating node embeddings and level embeddings from the semi-structured content of the first text corpus and from the masked hierarchical nodes, the level embeddings indicating a depth level of nodes, respectively, in a hierarchy of the semi-structured content;
    including the node embeddings and the level embeddings in a bi-directional transformer model; and
    training the bi-directional transformer model on the first text corpus by reducing loss from the bi-directional transformer model predicting the masked hierarchical nodes.

2. The method of claim 1, wherein the training produces a trained model, and wherein the method further comprises:
    inputting one or more terms into the trained model so that the trained model predicts a node type of the terms, wherein the node type is from the semi-structured content.

3. The method of claim 1, wherein the training produces a trained model, and wherein the method further comprises:
    inputting a second text corpus and a third text corpus into the trained model, wherein the second text corpus and the third text corpus each comprises semi-structured content, respectively; and
    receiving as output from the trained model a similarity score indicating a similarity between the second text corpus and the third text corpus.

4. The method of claim 1, wherein the bi-directional transformer model generates and uses bi-directional embeddings from the first text corpus, and wherein the bi-directional embeddings are selected from the group consisting of token embeddings, segment embeddings, and positional embeddings.

5. The method of claim 1, wherein the masking comprises masking a first node and a header node associated with the first node.

6. The method of claim 1, wherein the semi-structured content comprises at least one content type selected from the group consisting of hypertext markup language, extensible markup language, JavaScript Object Notation, and Markdown markup language.

7. The method of claim 1, further comprising inputting a non-semi-structured text corpus to a machine learning model so that the bi-directional transformer model is formed.

8. The method of claim 1, wherein the level embeddings are based on a number of node depth levels in the semi-structured content.

9. The method of claim 1, further comprising masking text within the hierarchical nodes;
    wherein the node embeddings and the level embeddings are also generated from the masked text; and
    wherein the bi-directional transformer model is trained on the first text corpus by reducing loss from the bi-directional transformer model predicting the masked text.

10. A computer system for natural language processing, the computer system comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    receiving a first text corpus that comprises semi-structured content comprising hierarchical nodes;
    masking some of the hierarchical nodes;
    generating node embeddings and level embeddings from the semi-structured content of the first text corpus and from the masked hierarchical nodes, the level embeddings indicating a depth level of nodes, respectively, in a hierarchy of the semi-structured content;

including the node embeddings and the level embeddings in a bi-directional transformer model; and training the bi-directional transformer model on the first text corpus by reducing loss from the bi-directional transformer model predicting the masked hierarchical nodes.

11. The computer system of claim 10, wherein the training produces a trained model, and wherein the method further comprises:

inputting one or more terms into the trained model so that the trained model predicts a node type of the terms, wherein the node type is from the semi-structured content.

12. The computer system of claim 10, wherein the training produces a trained model, and wherein the method further comprises:

inputting a second text corpus and a third text corpus into the trained model, wherein the second text corpus and the third text corpus each comprises semi-structured content, respectively; and receiving as output from the trained model a similarity score indicating a similarity between the second text corpus and the third text corpus.

13. The computer system of claim 10, wherein the bi-directional transformer model generates and uses bi-directional embeddings from the first text corpus, and wherein the bi-directional embeddings are selected from the group consisting of token embeddings, segment embeddings, and positional embeddings.

14. The computer system of claim 10, wherein the masking comprises masking a first node and a header node associated with the first node.

15. The computer system of claim 10, wherein the semi-structured content comprises at least one content type selected from the group consisting of hypertext markup language, extensible markup language, JavaScript Object Notation, and Markdown markup language.

16. A computer program product for natural language processing, the computer program product comprising a computer-readable storage medium having program instructions embodied therewith, wherein the program instructions are executable by a processor to cause the processor to perform a method comprising:

receiving a first text corpus that comprises semi-structured content comprising hierarchical nodes;

masking some of the hierarchical nodes;

generating node embeddings and level embeddings from the semi-structured content of the first text corpus and from the masked hierarchical nodes, the level embeddings indicating a depth level of nodes, respectively, in a hierarchy of the semi-structured content;

including the node embeddings and the level embeddings in a bi-directional transformer model; and training the bi-directional transformer model on the first text corpus by reducing loss from the bi-directional transformer model predicting the masked hierarchical nodes.

17. The computer program product of claim 16, wherein the training produces a trained model, and wherein the method further comprises:

inputting one or more terms into the trained model so that the trained model predicts a node type of the terms, wherein the node type is from the semi-structured content.

18. The computer program product of claim 16, wherein the training produces a trained model, and wherein the method further comprises:

inputting a second text corpus and a third text corpus into the trained model, wherein the second text corpus and the third text corpus each comprises semi-structured content, respectively; and receiving as output from the trained model a similarity score indicating a similarity between the second text corpus and the third text corpus.

19. The computer program product of claim 16, wherein the bi-directional transformer model generates and uses bi-directional embeddings from the first text corpus, and wherein the bi-directional embeddings are selected from the group consisting of token embeddings, segment embeddings, and positional embeddings.

20. The computer program product of claim 16, wherein the masking comprises masking a first node and a header node associated with the first node.

* * * * *